(12) United States Patent
Berniolles

(10) Patent No.: US 12,252,205 B2
(45) Date of Patent: Mar. 18, 2025

(54) DYNAMIC BLIND SPOT DETECTOR FOR MOTORCYCLE

(71) Applicant: Damon Motors Inc., Vancouver (CA)

(72) Inventor: Nicolas Berniolles, Richmond (CA)

(73) Assignee: Damon Motors Inc., Vancouver (CA)

( * ) Notice: Subject to any disclaimer, the term of this patent is extended or adjusted under 35 U.S.C. 154(b) by 0 days.

(21) Appl. No.: 17/535,519

(22) Filed: Nov. 24, 2021

(65) Prior Publication Data

US 2023/0159126 A1    May 25, 2023

(51) Int. Cl.
| | |
|---|---|
| *B62J 50/21* | (2020.01) |
| *B62J 6/24* | (2020.01) |
| *B62J 45/415* | (2020.01) |
| *G01S 13/931* | (2020.01) |
| *G06V 20/56* | (2022.01) |

(52) U.S. Cl.
CPC .............. *B62J 50/21* (2020.02); *B62J 6/24* (2020.02); *B62J 45/4151* (2020.02); *G01S 13/931* (2013.01); *G06V 20/588* (2022.01); *G01S 2013/9315* (2020.01)

(58) Field of Classification Search
CPC .......... B62J 50/21; B62J 6/24; B62J 45/4151; G01S 13/931; G01S 2013/9315; G06V 20/588
See application file for complete search history.

(56) References Cited

U.S. PATENT DOCUMENTS

| | | | |
|---|---|---|---|
| 9,153,133 B1 | 10/2015 | Lunsford | |
| 2020/0231170 A1 | 7/2020 | Grelaud et al. | |
| 2020/0269868 A1 | 8/2020 | Giraud et al. | |
| 2020/0379465 A1* | 12/2020 | Adam | G05D 1/024 |
| 2021/0171057 A1 | 6/2021 | Giraud et al. | |
| 2022/0169273 A1* | 6/2022 | Horn | B60W 50/16 |

OTHER PUBLICATIONS

International Application Serial No. PCT/CA22/51696, Search Report and Written Opinion mailed Feb. 17, 2023, 10 pgs.

* cited by examiner

*Primary Examiner* — Daryl C Pope
(74) *Attorney, Agent, or Firm* — Damien G. Loveland

(57) ABSTRACT

When riding a motorcycle, a vehicle in the rider's blind spot poses a hazard. A fixed range blind spot detector may not properly detect vehicles in adjacent lanes if the motorcycle is at one side or other of the lane that it is travelling in. A lane position sensor detects the position of the motorcycle with respect to the centerline of the lane in which it is travelling. Depending on the sideways position of the motorcycle within its lane, the widths of the detection zones of the blind spot detector are adjusted so that between them they cover a majority of the width of each adjacent lane.

18 Claims, 6 Drawing Sheets

DYNAMIC BLIND SPOT DETECTOR FOR MOTORCYCLE

FIELD OF INVENTION

This application relates to road safety. In particular, it relates to a blind spot detector for motorcycles.

BACKGROUND

On the road, a motorcycle occupies only about a quarter of the surface occupied by a car. As a result, a motorcycle's static blind spot detector may not have a full view of one or both adjacent lanes depending on where the motorcycle is within its lane.

For example, if the motorcycle is travelling in the right side of its lane, the rider may have some difficulty spotting a vehicle behind and in the left-adjacent lane, as may the motorcycle's blind spot detector. Similarly, if the motorcycle is travelling in the left side of its lane, the rider may have some difficulty spotting a vehicle in the right-adjacent lane, as may the motorcycle's blind spot detector. When the motorcycle is travelling in the middle of the lane, the blind spot detector can view of both adjacent lanes and should detect a vehicle on either side.

Missing the detection of a vehicle in an adjacent lane can prove to be dangerous or even fatal for both the rider of the motorcycle and the driver of the car or other vehicle in the adjacent lane.

FIG. 1 shows motorcycle 8 with a static blind spot detector. The motorcycle 8 is travelling in the middle of its lane 14 with a car 24 travelling in the left-adjacent lane 12. The range of the static blind spot detector is shown by outline 20 to the left of the motorcycle 8 and outline 22 to the right. The left zone 20 of the blind spot detector covers part of the lane 14 in which the motorcycle is travelling and part of the left-adjacent lane 12 in which the car 24 is travelling. The right zone 22 of the blind spot detector covers part of the lane 14 in which the motorcycle is travelling and part of the right-adjacent lane 16 in which no car is travelling. In this scenario, the car 24 is partially within the left zone of the blind spot detector, and so the blind spot detector senses the car and alerts the rider of the motorcycle. As a result, the rider is alerted, for example, by a visual signal, an audible signal or a haptic signal.

FIG. 2 shows the motorcycle 8 with the same, static blind spot detector. The motorcycle 8 is now in the right of its lane 14 with the car 24 still in the left-adjacent lane 12. The range of the static blind spot detector is shown by outline 20 for the left zone and outline 22 for the right zone. As can be seen by a comparison with FIG. 1, the left zone 20 and right zone 22 have not changed in size as the motorcycle has moved over from the middle of its lane 14 to the right of its lane. As a result, car 24, which is in the blind spot of motorcycle 8, is now outside of the left zone 20 of the static blind spot detector. Due to the fixed range of the static blind spot detector, the rider of the motorcycle 8 is not alerted to the presence of the car 24 in the left-adjacent lane 12.

While it may be possible to widen the zones 20, 22 of the static blind spot detector, the risk is that, in this scenario, the right zone 22 may be widened so much that it would start to detect objects on a sidewalk to the right of lane 16. This would lead to false alerts.

SUMMARY OF INVENTION

The purpose of the present invention is to use cameras with optionally an inertial measurement unit (IMU) fusion to estimate the position of a motorcycle in its lane, and dynamically steer the blind spot detector for better visualization of the adjacent lanes. The blind spot detector uses radar as the primary sensing technique, and the data may be enhanced with camera support. The aim is therefore to provide added safety on the road. Sideways changes in position of the motorcycle in its lane are detected, and the widths of the detection zones of the blind spot detector are adjusted accordingly. The zones are adjusted so that the adjacent lanes are covered by the detector irrespectively of where the motorcycle is within its lane. As the motorcycle moves to the right of its lane, the left detection zone is increased in width and the right detection zone is decreased. As the motorcycle moves to the left of its lane, the left detection zone is decreased in width and the right detection zone is increased.

Disclosed is a method for controlling a blind spot detector on a motorcycle comprising: detecting a lateral change in position of the motorcycle in its lane; and adjusting a width of a detection zone of the blind spot detector; wherein the width is decreased or increased corresponding respectively to whether the lateral change is towards or away from a side of the motorcycle where the detection zone is located.

Also disclosed is a method for setting a blind spot detector zone on a side of a motorcycle comprising: determining a first lateral position of the motorcycle within a lane in which it is travelling; setting said zone to a first width; determining that the motorcycle is then in a second lateral position within the lane; and setting said zone to a second width; wherein the second width is wider than the first width when the second lateral position relative to the first lateral position is away from said side; wherein the second width is narrower than the first width when the second lateral position relative to the first lateral position is towards said side.

Further disclosed is a blind spot detector for a motorcycle comprising: one or more sensors that view a left detection zone and a right detection zone; a lane position sensor configured to detect a position of the motorcycle within a lane in which it is travelling; and a controller configured to set widths of the left and right detection zones depending on the position.

This summary provides a simplified, non-exhaustive introduction to some aspects of the invention, without delineating the scope of the invention.

BRIEF DESCRIPTION OF DRAWINGS

The following drawings illustrate embodiments of the invention, which should not be construed as restricting the scope of the invention in any way.

DESCRIPTION

A. Glossary

Engine control unit (ECU)—refers to the computer that controls and monitors various components and states of an engine or vehicle in which the engine is mounted.

Inertial Measurement Unit (IMU)—refers to an electronic device such as an accelerometer and gyroscope that measures a body's specific acceleration and the angular rotation rate of the body.

Module—this can refer to any component in this invention and to any or all of the features of the invention without limitation. A module may be a software, firmware or hardware module, and may be located in one or multiple devices.

Position—this relates to the position of a motorcycle in the lane in which it is travelling. In particular, it is the lateral position in relation to the centerline of the lane in which it is travelling. The position may be on the centerline or to the left or right of it by different distances. The position may be referred to as a sideways position of the motorcycle, since it is a measure of the movement of the motorcycle sideways within the lane.

Real-time—means that as one action is occurring, another action is occurring in response to it and at the same time, subject to inherent time lags due to electronic and mechanical limitations. The actions may appear to a human to be simultaneous, or to be close enough together that their occurrences are, for substantially all intents and purposes, as good as simultaneous.

System—when used herein refers to a system for dynamically adjusting a detection width of a blind spot detector, the system being the subject of the present invention.

B. Embodiments

Figure 1:
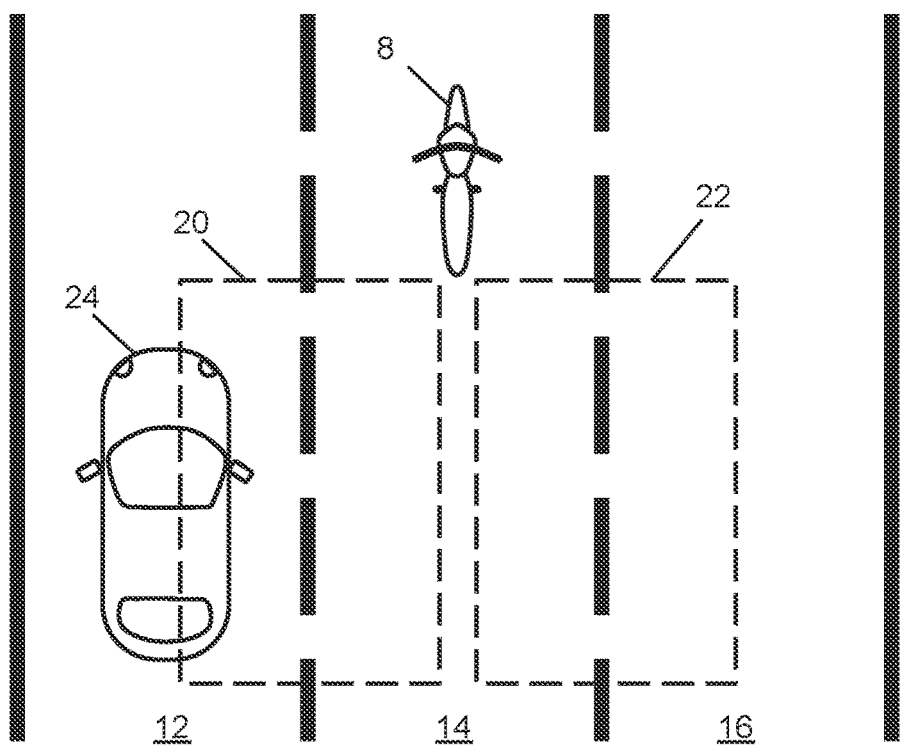
FIG. 1 (Prior art) depicts a motorcycle in the middle of its lane and a car in its left-adjacent lane, as well as the range of the motorcycle's static blind spot detector while in said position.
Figure 2:
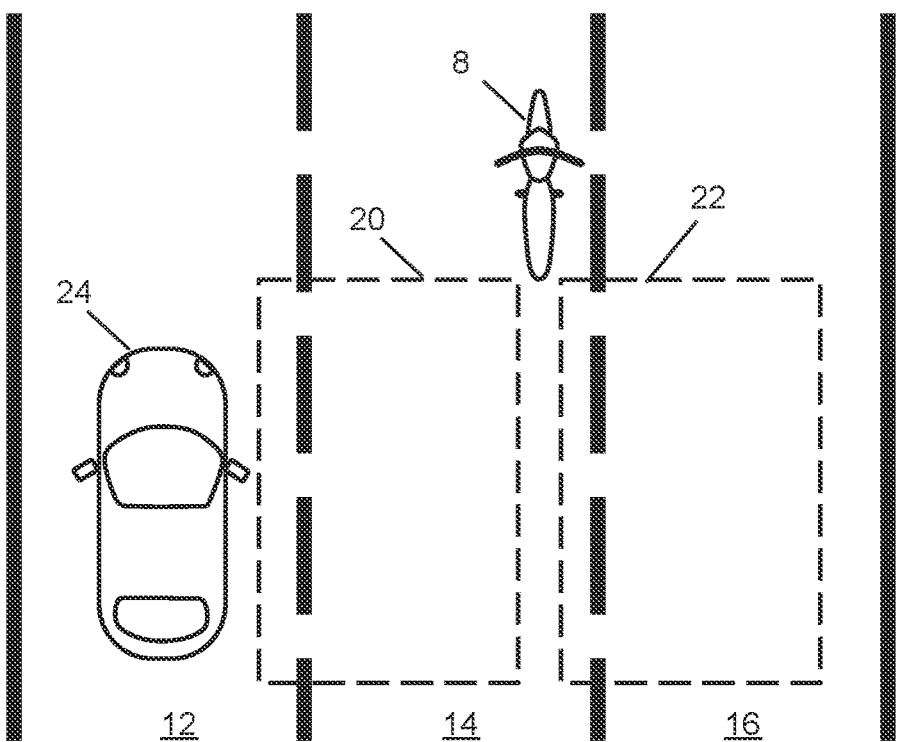
FIG. 2 (Prior art) depicts the motorcycle in the right side of its lane and a car in its left-adjacent lane, as well as the range of the motorcycle's static blind spot detector while in said position.
Figure 3:
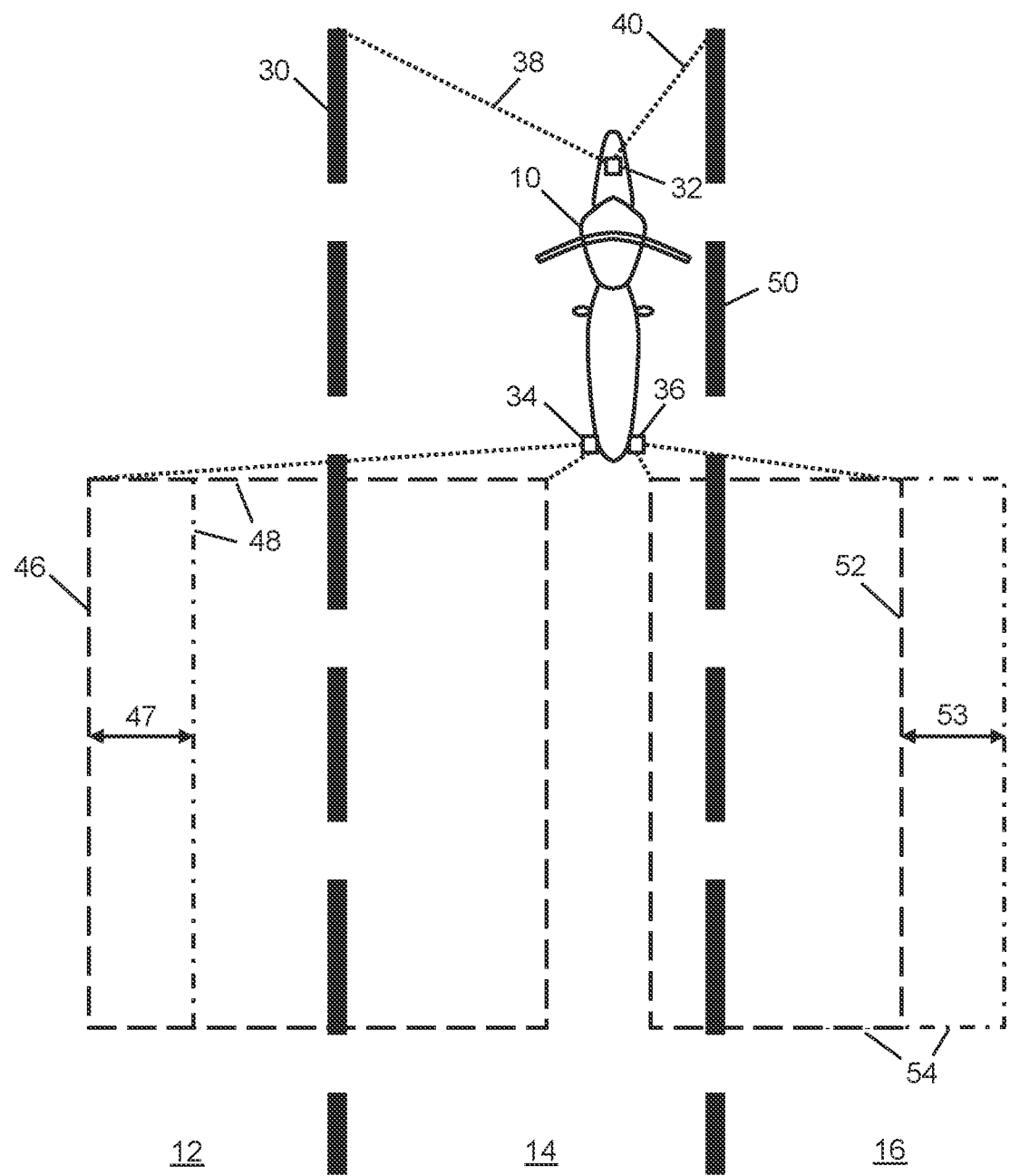
FIG. 3 depicts a motorcycle in the right side of its lane, the central range of its blind spot detector, the right-side reduced range of the blind spot detector, and the left-side extended range of the blind spot detector as proposed by this invention.

FIG. 3 shows motorcycle 10 with a dynamic blind spot detector. The motorcycle is travelling in the right of its lane 14. The motorcycle 10 has a lane position sensor 32, which detects the position of motorcycle 10 in reference to the lane markings 30 and 50. The lane position sensor 32 and a controller to which it is attached, determine whether the motorcycle 10 is at the left of its lane 14, the middle of its lane or the right of its lane.

In some embodiments, the position is determined on a continuous scale, which may vary from 0-100%, where 0% corresponds to the motorcycle 10 being on the left hand lane marking 30, 50% corresponds to the motorcycle being on the centerline of the lane, and 100% corresponds to the motorcycle being on the right hand lane marking 50.

The lane position sensor 32 may be a video camera, for example, and the controller may include a processing module that analyzes the video stream to determine where the lane markings 30, 50 are in the field of view of the camera. From this, the module is able to calculate the position of the motorcycle within its lane. An IMU mounted on the motorcycle may also be used to determine sideways movements of the motorcycle. Data output from the IMU may be fused with the video camera in order to better judge the position of the motorcycle within its lane. The lean of the motorcycle as detected by the IMU may also be taken into account in determining the position of the motorcycle within its lane.

Blind spot sensor 34 detects vehicles in the blind spot to the left of motorcycle 10 and blind spot sensor 36 detects vehicles in the blind spot to the right of motorcycle. Blind spot sensors 34, 36, which are radar devices in the blind spot detector, are connected to the controller, which in turn is connected to one or more output devices for alerting the rider of the motorcycle in the event that a vehicle is detected in one of the blind spots. The output devices may include a haptic signaling device, an audible signaling device or a visual signaling device.

Outline 48 shows the central range of the blind spot detector zone to the left side of motorcycle 10. The central range would be the size of the detection zone if the motorcycle 10 were travelling in the middle of its lane 14. Instead, as the motorcycle 10 is in the right of its lane 14, the dynamic blind spot detector has extended this range by distance 47. This allows the motorcycle 10 to detect vehicles further into its left-adjacent lane 12, as shown by outline 46. Given the typical size of a car, if a car is in the left-adjacent lane 12 then it would at least partially overlap the left-side detection zone so that the blind spot sensor 34 would detect it.

Outline 54 shows the central range of the static blind spot detector zone to the right side of motorcycle 10. The central range would be the size of the detection zone if the motorcycle 10 were travelling in the middle of its lane 14. Instead, as the motorcycle 10 is in the right of its lane 14, the dynamic blind spot detector reduces this range by distance 53, to what is shown by outline 52. This allows motorcycle 10 to maintain the ability to detect vehicles in its right-adjacent lane 16, without detecting objects on a sidewalk to the right of lane 16, or another lane beyond right-adjacent lane 16. Simultaneously allowing the range of the left side to increase and the range of the right side to decrease allows motorcycle 10 to detect vehicles well in both of the adjacent lanes 12, 16.

The lean of the motorcycle may also be taken into account when adjusting the blind spot detection zones. For example, if the motorcycle is leaning over by a given angle, then the images captured by the video camera or other sensor are rotated by an equal angle to compensate for the lean.

Figure 4:
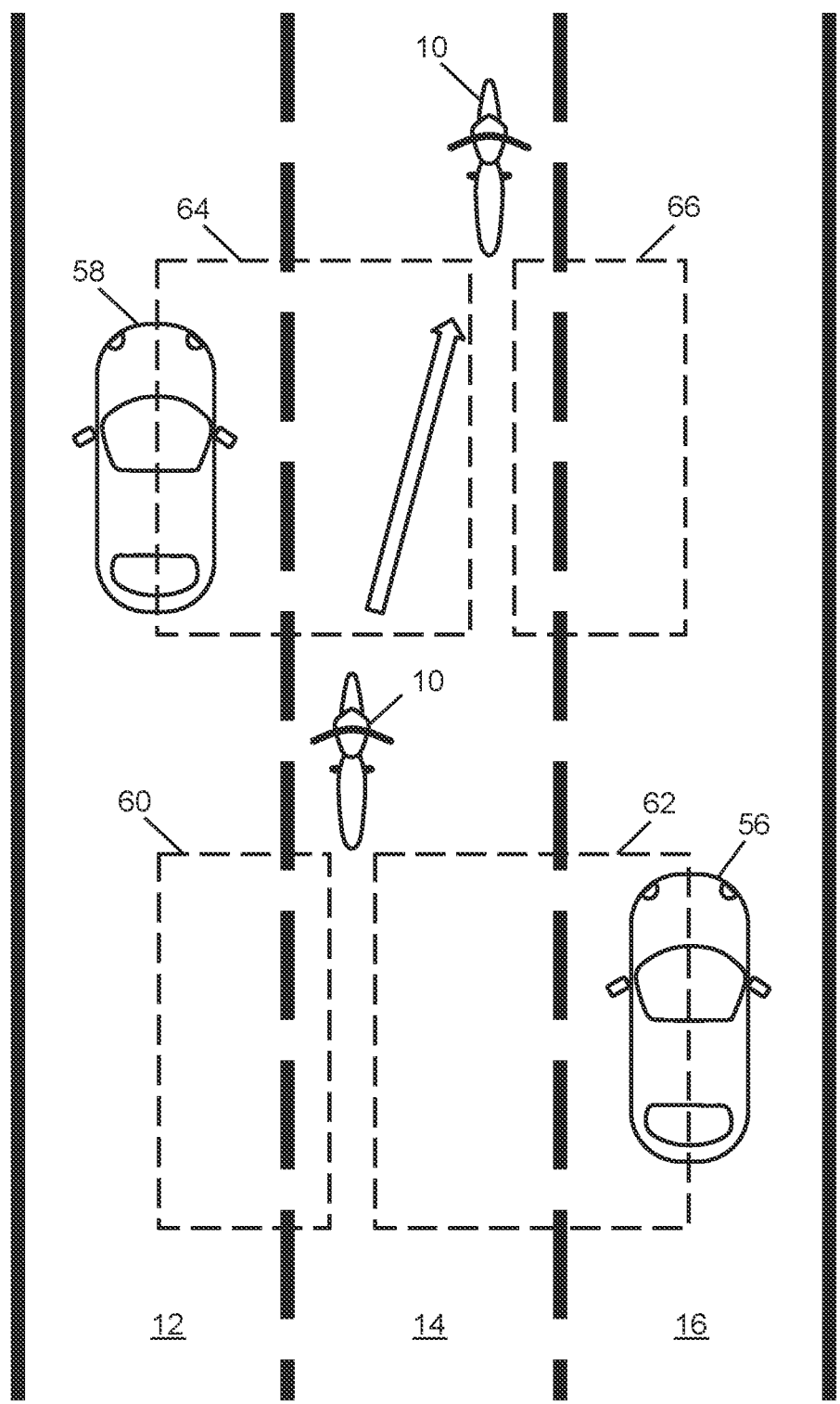
FIG. 4 depicts a motorcycle in the left side of its lane moving to the right side of its lane and cars in the adjacent lanes, as well as the dynamic adjustment of the motorcycle's blind spot detector as proposed by this invention.

FIG. 4 shows motorcycle 10 moving from the left side of its lane 14 to the right side of its lane 14. In its initial position, there is a car 56 in the right-adjacent lane 16 of motorcycle 10.

The dynamic blind spot detector allows motorcycle 10 to see far enough into the right-adjacent lane 16 to detect car 56 and trigger an alert. Despite being on the left side of its lane 14, the dynamic blind spot detector has adjusted the range of detection for motorcycle 10 to see well into both its adjacent lanes, demonstrated by outline of detection zone 60 to the left and outline of detection zone 62 to the right.

As it moves forward, motorcycle 10 moves to the right side of its lane 14. Upon detecting this movement within the lane 14, the dynamic blind spot detector adjusts its range to cover a larger range on the left side, demonstrated by outline of detection zone 64, to see well into the left-adjacent lane 12, detecting car 58 and triggering an alert. The detection zone 66 is reduced compared to detection zone 62, where even with this reduction in range it is possible to continue seeing well into the lane 16. Detection of the sideways movement of the motorcycle within its lane may be based upon detecting its instantaneous position within the lane, changes in its position using the IMU, or a fusion of these two techniques.

The blind spot detector range, or detection zone, on a given side of the motorcycle is therefore increased as the motorcycle moves away from the given side, and narrowed as the motorcycle moves towards the given side.

Figure 5:
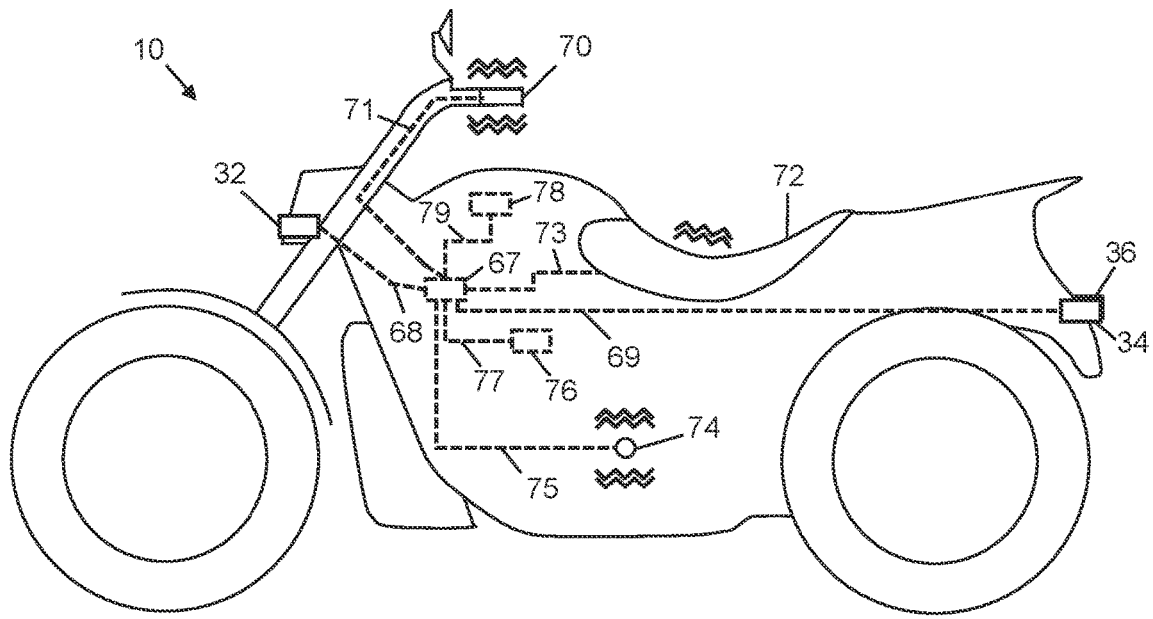
FIG. 5 depicts a side schematic view of a motorcycle and the components responsible for allowing the blind spot detector to move and/or change its view range(s).

FIG. 5 depicts a side schematic view of the left side of motorcycle 10. Lane position sensor 32 is responsible for detecting the position of motorcycle 10 in reference to its sideways location within its lane. In other words, the position of the motorcycle is determined along a horizontal line that is perpendicular to the line of travel of the motorcycle, the line of travel being the centerline of the motorcycle's lane. Blind spot sensor 34 is responsible for detecting objects in the blind spot to the left of motorcycle 10, and blind spot sensor 36 is responsible for detecting objects in the blind spot to the right of motorcycle 10.

Messages are sent to control unit 67, via connection 68, regarding the position of motorcycle 10 within its lane, as detected by lane position sensor 32. In response, the control unit 67 sends signals via connection 69 to the blind spot sensors 34 and 36, so that they can adjust their detection ranges (zones) according to the position of the motorcycle within its lane. Control unit 67 continually takes the information regarding the position of the motorcycle within its lane and adjusts the ranges of the blind spot sensors 34 and 36 accordingly. The information regarding whether there is a vehicle in either of the adjacent lanes, as detected by blind spot sensors 34 and 36, is sent to control unit 67 via connection 69. Communication of whether or not there is a vehicle in one of the blinds spot zones occurs frequently, multiple times per second, so that the control unit 67 is effectively kept up to date in real time.

If the control unit 67 receives a signal from the blind spot sensors 34, 36, which indicates the presence of a vehicle in one of the blind spot zones, then it alerts the rider. It does this by activating one or more haptic devices on the motorcycle. The haptic devices may include, for example, handlebar vibrators 70 which are activated via connection 71, a seat vibrator 72 which is activated via connection 73, and foot-peg vibrators 74 which are activated via connection 75.

If there is a vehicle in either of the adjacent lanes, the haptic devices 70, 72, and 74 are activated to inform the rider of the hazard. Thus, allowing the motorcycle 10 to see a safe range into both its adjacent lanes and give a warning about other vehicles on the road in the blind spots behind the motorcycle. In some embodiments, the haptic devices 70, 72, 74 are only triggered on the side of the motorcycle where the vehicle in the blind spot is detected. For example, if a vehicle is detected in the blind spot detector zone in the right-adjacent lane, then only the haptic device in the right handlebar or on the right side of the seat is activated.

The controller 67 may also be connected to the ECU 76 of the motorcycle via connection 77, and may also be connected to an IMU 78, via connection 79.

Figure 6:
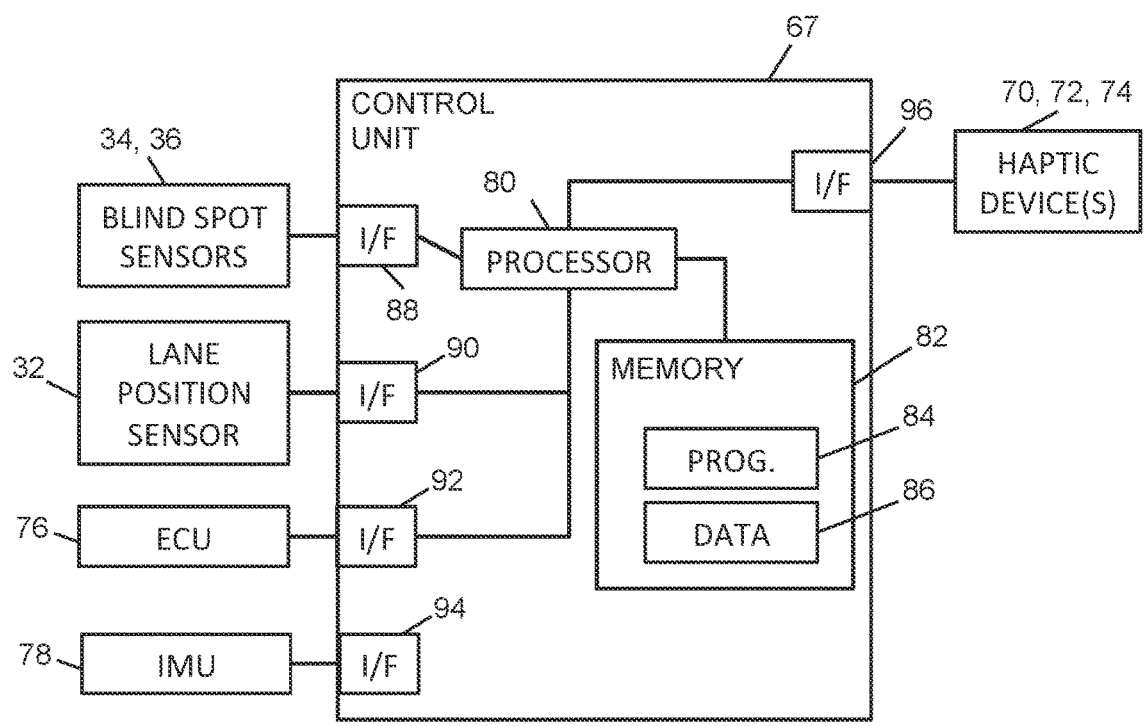
FIG. 6 depicts the components of a control unit of a motorcycle for detecting the position of the motorcycle within its lane, adjusting the range of the blind spot detector, and triggering an alert.

FIG. 6 shows a detailed breakdown of control unit 67. In the control unit 67 is a processor 80, which is connected to other parts of the control unit and processes the information sent to it by the various sensors and generates a response accordingly.

The memory 82 has both the preprogrammed instructions 84 sufficient to operate the system as well as room to store the new data 86 regarding the positions and movements of the motorcycle.

The blind spot sensors 34 and 36, the lane position sensor 32, and the electronic control unit (ECU) 76 send information to processor 80 via interfaces (I/F) 88, 90, and 92, respectively. The IMU 78 is connected to processor 80 via interface 94. The processor 80 then processes this information according to the programmed instructions 84, and signals appropriate responses for the blind spot sensors 34, 36 via interface 88, and the haptic devices 70, 72, 74 via interface 96. The response transmitted to the blind spot sensors could be either an adjustment of one or both of the blind spot sensors, or an instruction to remain detecting in their currently set position.

The response transmitted to the haptic devices may be an instruction to switch on and start vibrating, for example if a vehicle is detected in one of the blind spot detection zones. The instruction to vibrate may be an instruction to vibrate continuously or intermittently, or with a changing pulse rate or changing intensity. Different patterns of vibration may be used to communicate to the rider different types of hazard. Different types of hazard may, for example, include different vehicle types, different relative speeds between the detected vehicle and the motorcycle, different distances between the detected vehicle and the motorcycle.

In some embodiments, the processor 80 also sends this information to memory 82 to be stored with data 86. In this way, a record of the detected vehicle and the corresponding haptic alert response is maintained for future reference.

Figure 7:
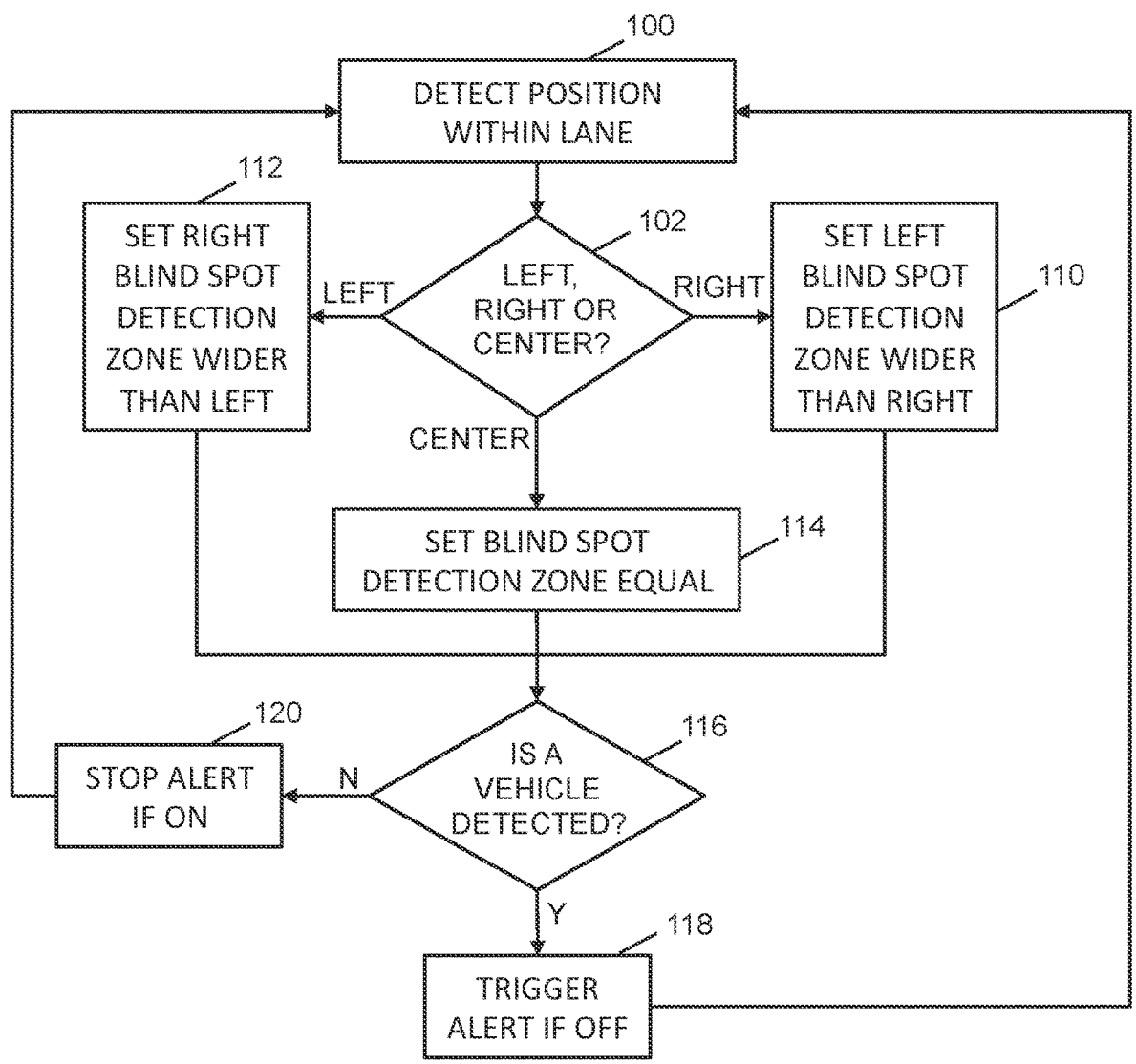
FIG. 7 depicts a flow chart through which the position of the motorcycle is detected, the range of the blind spot detector is adjusted, and a decision is made about whether to trigger an alert.

FIG. 7 is a flow chart through which the determination is made to generate a trigger to alert the rider of the motorcycle. First the position of the motorcycle within its lane is detected in step 100. The determination of it being in the left, right, or center is made in step 102. In other embodiments, a more refined determination of the position may be made.

If the position is left, the right blind spot detection zone is set wider than the left blind spot detection zone, in step 112. If the position is to the right, the left blind spot detection zone is set wider than that on the right, in step 110. If the position is in the center, the left and right blind spot detection zones is set to equal each other, in step 114.

Next, for all positions of the motorcycle within its lane, the system determines whether a vehicle is detected in one of the blind spot detection zones, in step 116. If a such a vehicle is detected, an alert is triggered in step 118, if no alert is already triggered. If a vehicle is not detected, the process proceeds to step 120, in which the alert is stopped if it is on. The process then loops back to step 100 as the motorcycle continues travelling. If an alert is triggered in step 118, the process loops back to step 100, in which the system continues to detect the position of the motorcycle within its lane.

Figure 8:
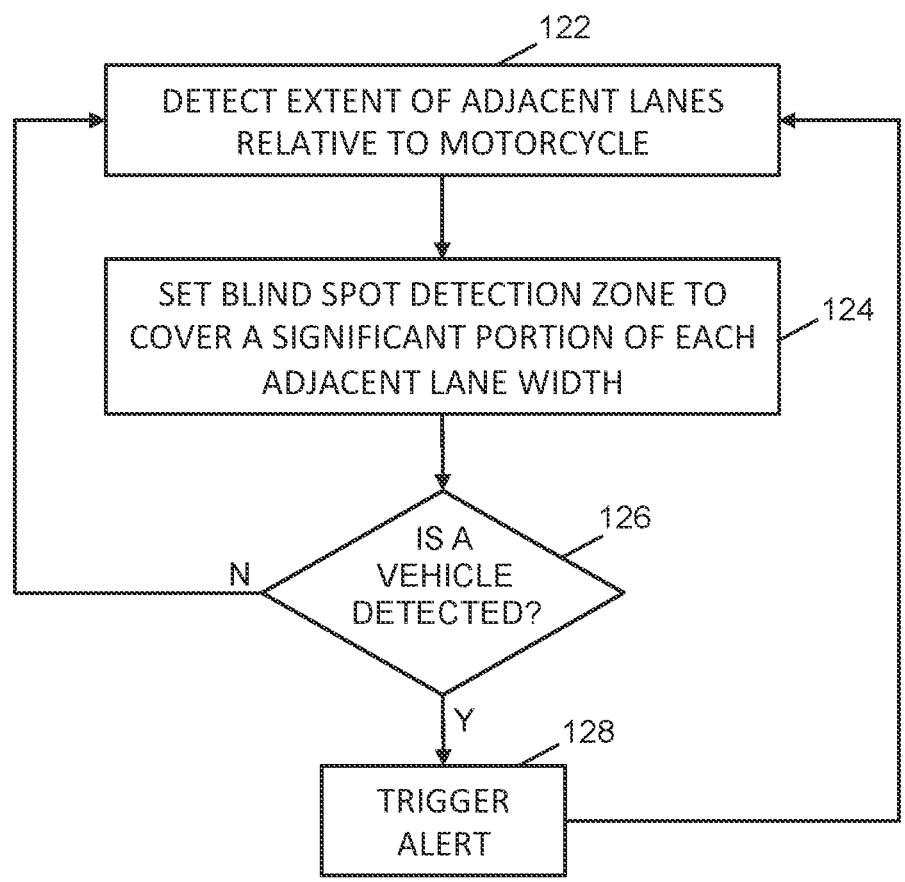
FIG. 8 depicts a flow chart through which, once the range of the blind spot detector is set, a decision is made about whether to trigger an alert.

FIG. 8 depicts another flow chart through which, once the ranges of the blind spot detector zones are set, a decision is made about whether to alert a trigger. First, the extents of the adjacent lanes relative to the motorcycle are detected, in step 122. The blind spot detection zones are then set to cover a significant portion of both adjacent lanes, in step 124. A significant portion of a lane is considered to be more than half of the width of the lane. Portions of the lane in which the motorcycle is travelling are also optionally included in the detection zones. If, in step 126, a vehicle is detected in either of the adjacent lanes then an alert is triggered in step 128. If a vehicle is not detected in either of the adjacent lanes, or in the blind spot detection zones extending into the lane the motorcycle is travelling in, the process continues as the motorcycle continues on.

C. Variations

While the lane position sensor has been shown to detect the lane markings 30, 50, in other embodiments the lane position sensor detects the widths of the left-adjacent lane 12 and the right-adjacent lane 16. As a result, the sideways extent of the left and right blind spot detection zones may be tuned to match the boundaries of the left and right adjacent lanes furthest from the rider. In some embodiments, the lane position sensor is configured to detect whether or not adjacent lanes exist. If there are no adjacent lanes, then the zones of the blind spot detector are either switched off, or they are adjusted so that they cover only up to the width of the lane in which the motorcycle is travelling.

In another variant, the blind spot sensors 34, 36 serve as the lane position sensor. In another embodiment, the blind spot sensors may be a single blind spot sensor that is configured to detect two different zones. In practice, the detection zones of the blind spot sensors may be shaped differently to the rectangular shapes shown schematically in the figures. The blind spot sensors are radars, for example. The blind spot sensors are, in some embodiments, enhanced with a fixed camera whose image frames are analyzed on the fly. In this case, the blind spot detection zones are adjusted using software. In other embodiments, the blind spot sensors are separate radars that are physically steered according to the position of the motorcycle in its lane and its lean.

The blind spot sensors may include one or more radar detectors. The angular detection zone of each radar may be adjusted to control both the effective width and direction of the blind spot detection zones.

In some embodiments, the width of the detection zones of the blind spot detector are adjusted as the widths of the lanes change, even though the position of the motorcycle within its travelling lane does not change. The detection widths may change independently of each other, corresponding to how the widths of the adjacent lanes change.

Connections may be wired or wireless. Where wired, each connection may include multiple conduction paths that are electrically insulated from each other.

In some embodiments, there may be no adjacent lanes and the blind spot detector ranges are dynamically adjusted so that they detect to the side boundaries of the lane that the motorcycle is travelling in, for whatever the lateral position of the motorcycle is in the lane. In this embodiment, the blind spot sensor can sense if another motorcycle, for example, is in the blind spot of the first motorcycle.

While the description has been given in relation to motorcycles, it may be implemented on other, wider vehicles. This is because some vehicles, such as smaller cars, may not always travel centrally in their lane, and may therefore benefit from a dynamic blind spot detector as described herein.

Where functions have been described as being performed by a specific module, these functions may be performed by other modules in other embodiments. Components may be connected together differently in other embodiments. The controller 67 may be embodied within the ECU, or one or more modules of the controller may be embodied in the ECU. Haptic devices may be activated for reasons other that the detection of a vehicle in a blind spot detection zone. In general, unless otherwise indicated, singular elements may be in the plural and vice versa with no loss of generality.

Sending a signal can be interpreted to be either the actual creation of a signal that is transmitted from a sensor or the ceasing of a signal that is being created by and transmitted from the sensor. Either way, the change in output of the sensor can be interpreted as a signal. A null signal may also be considered to be a signal. The signal may, for example, be a change in voltage, resistance, capacitance or current.

Throughout the description, specific details have been set forth in order to provide a more thorough understanding of the invention. However, the invention may be practised without these particulars. In other instances, well known elements have not been shown or described in detail and repetitions of steps and features have been omitted to avoid unnecessarily obscuring the invention. Accordingly, the specification and drawings are to be regarded in an illustrative, rather than a restrictive, sense.

It will be clear to one having skill in the art that further variations to the specific details disclosed herein can be made, resulting in other embodiments that are within the scope of the invention disclosed. Steps in the flowchart may be removed or other steps added without altering the main outcome of the process.

All parameters and configurations described herein are examples only and may be changed depending on the specific embodiment. Accordingly, the scope of the invention is to be construed in accordance with the substance defined by the following claims.

The invention claimed is:

1. A method for controlling a blind spot detector on a motorcycle, the method comprising:
    detecting, from lane markings shown in a field of view of a camera of a lane position sensor, a lateral change in a position of the motorcycle, wherein the lateral change comprises the motorcycle moving towards an edge of a lane on a first side of the motorcycle; and
    adjusting, based on the lateral change detected from the lane markings shown in the field of view of the camera of the lane position sensor, a width of a detection zone of the blind spot detector, wherein:
        the adjusting the width of the detection zone comprises decreasing the width of the detection zone on the first side of the motorcycle, and
        the width of the detection zone is further adjusted by steering the blind spot detector.

2. The method of claim 1, wherein the detection zone spans a majority of a width of another lane that is adjacent to the lane, and wherein the width is adjusted in real time in response to detecting the lateral change in position of the motorcycle in its lane.

3. The method of claim 1, comprising:
    detecting a vehicle in the detection zone; and
    in response, alerting a rider of the motorcycle.

4. The method of claim 3, comprising stopping the alerting when the vehicle is no longer detected in the detection zone.

5. The method of claim 3, wherein the rider is alerted with a haptic signal on the first side of the motorcycle where the detection zone is located.

6. The method of claim 1, wherein the detection zone is a first detection zone, and wherein the method further comprises:
    adjusting a width of a second detection zone of the blind spot detector, the second detection zone disposed on a second side of the motorcycle opposite the first side, wherein the width of the second detection zone is increased corresponding to an amount that the width of the first detection zone is decreased.

7. The method of claim 6, wherein, the first detection zone spans a majority of a width of a second lane that is adjacent to the lane on the first side, the second detection zone spans a majority of a width of a third lane that is adjacent to the lane on the second side, and wherein the method further comprises:
   detecting a vehicle in the first or second detection zone; and
   in response, alerting a rider of the motorcycle as to which of the detection zones the vehicle is in.

8. The method of claim 1,
   wherein the camera is a first camera, and wherein the adjusting the width of the detection zone further comprises:
      analyzing an image frame associated with the detection zone, the image frame captured by a second camera; and
      adjusting the detection zone based on analysis of the image frame.

9. The method of claim 1, comprising:
   detecting, with an inertial measurement unit (IMU), a lean of the motorcycle; and
   accounting for the lean when adjusting the width of the detection zone of the blind spot detector.

10. A method for setting a blind spot detector zone on a side of a motorcycle using a blind spot detector, the method comprising:
    determining, from lane markings shown in a field of view of a camera of a lane position sensor, a first lateral position of the motorcycle within a lane in which it is travelling;
    setting the blind spot detector zone to a first width;
    determining, from the lane markings shown in the field of view of a camera of the lane position sensor, that the motorcycle is then in a second lateral position within the lane, the motorcycle in the second lateral position disposed closer to, relative to the first lateral position, an edge of the lane on the side of the motorcycle; and
    setting, based on the determination from the lane markings shown in the field of view of the camera of the lane position sensor that the motorcycle is in the second lateral position within the lane, the blind spot detector zone to a second width, wherein the second width is narrower than the first width,
    wherein the first width and the second width are adjusted using the blind spot detector.

11. The method of claim 10, comprising:
    detecting a vehicle in the blind spot detector zone; and
    in response, alerting a rider of the motorcycle with a haptic signal on the side of the motorcycle where the blind spot detector zone is located.

12. The method of claim 10, wherein the blind spot detector is a first blind spot detector and the side is a first side, and wherein the method further comprises setting a second blind spot detector zone on a second side, opposite the first side, of the motorcycle by:
    setting the second blind spot detector zone to a third width upon determining the first lateral position; and
    setting the second blind spot detector zone to a fourth width upon determining the second lateral position, wherein the fourth width is wider than the third width.

13. A blind spot detector for a motorcycle, the blind spot detector comprising:
    one or more sensors, configured to view a first detection zone on a first side of the motorcycle and a second detection zone on a second side of the motorcycle opposite the first side; and
    a lane position sensor, comprising a camera and configured to detect, from lane markings shown in a field of view of the camera, a lateral position of the motorcycle within a lane in which it is travelling; and
    a controller configured to:
       determine, from the lane markings shown in the field of view of the camera, that the lateral position of the motorcycle within the lane is biased to the first side; and
       set, based on the lateral position determined from the lane markings shown in the field of view of the camera, a first width of the first detection zone to be less than a second width of the second detection zone,
    wherein the first width of the first detection zone and the second width of the second detection zone are adjustable using the one or more sensors.

14. The blind spot detector of claim 13, wherein:
    the first detection zone spans a majority of a width of another lane that is to the first side of the lane in which the motorcycle is travelling; and
    the second detection zone spans a majority of a width of yet another lane that is to the second side of the lane in which the motorcycle is travelling.

15. The blind spot detector of claim 13, comprising a signaling device, wherein the controller activates the signaling device when the blind spot detector detects a vehicle in the first detection zone or the second detection zone.

16. The blind spot detector of claim 13, comprising a first signaling device and a second signaling device, wherein the controller is configured to activate:
    the first signaling device when the blind spot detector detects a vehicle in the first detection zone; and
    the second signaling device when the blind spot detector detects another vehicle in the second detection zone.

17. The blind spot detector of claim 15, wherein the signaling device generates a haptic signal, an audible signal or a visual signal.

18. The blind spot detector of claim 13, wherein the one or more sensors comprise one or more radars.

* * * * *